US012672074B2

(12) United States Patent
Khalid et al.

(10) Patent No.: US 12,672,074 B2
(45) Date of Patent: Jun. 30, 2026

(54) RESTORED COVERAGE UNDER SAS SUSPENSION DUE TO INCUMBENT ACTIVITY IN A CBRS NETWORK

(71) Applicant: Charter Communications Operating, LLC, St. Louis, MO (US)

(72) Inventors: Saran Khalid, Denver, CO (US); Perwaiz Akhtar, Aurora, CO (US); Mohammedyusuf Shaikh, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 393 days.

(21) Appl. No.: 18/409,274

(22) Filed: Jan. 10, 2024

(65) Prior Publication Data

US 2025/0227626 A1 Jul. 10, 2025

(51) Int. Cl.
*H04W 52/24* (2009.01)

(52) U.S. Cl.
CPC ....... *H04W 52/245* (2013.01); *H04W 52/243* (2013.01)

(58) Field of Classification Search
CPC .......................... H04W 52/245; H04W 52/243
See application file for complete search history.

(56) References Cited

U.S. PATENT DOCUMENTS

| | | | | |
|---|---|---|---|---|
| 11,032,781 B2 * | 6/2021 | Chang | ................... | H04W 52/38 |
| 2009/0005105 A1 * | 1/2009 | Hwang | ................. | H04W 52/10 |
| | | | | 455/522 |
| 2018/0242165 A1 * | 8/2018 | Macmullan | ........... | H04W 16/18 |
| 2019/0081690 A1 * | 3/2019 | Mueck | ................. | H04B 7/0617 |
| 2019/0132806 A1 * | 5/2019 | Kumar | ................. | H04W 52/143 |
| 2020/0092825 A1 * | 3/2020 | McCullough | ....... | H04W 52/143 |
| 2022/0007200 A1 * | 1/2022 | Sevindik | ............. | H04W 52/143 |

(Continued)

OTHER PUBLICATIONS

Spectrum Sharing Committee Work Group 3, "Signaling Protocols and Procedures for Citizens Broadband Radio Service (CBRS): Spectrum Access System (SAS)—Citizens Broadband Radio Service Device (CBSD) Interface Technical Specification." Technical Specification, Document Code WINNF-TS-0016 Version V1.2.7 (Mar. 21, 2022) 1-52.

*Primary Examiner* — David Bilodeau
(74) *Attorney, Agent, or Firm* — Mendelsohn Dunleavy, P.C.; Steve Mendelsohn

(57) ABSTRACT

In response to receiving instructions from a Spectrum Access System (SAS) to modify (e.g., reduce and/or cease) network transmissions in one or more Citizens Broadband Radio Service (CBRS) sub-bands following the SAS's detection of incumbent activity, the network's Operation Support System (OSS) predicts or measures received signal strength (RSS) levels based on the SAS's original instructions, estimates RSS levels based on modified versions of the SAS's instructions that prioritize higher-NPV (net present value) CBRS base stations (CBSDs) over lower-NPV CBSDs, selects a modified version whose RSS levels are approximately the same as or less than the RSS levels of the SAS's original instructions, and transmits to the SAS requests for the selected modified version. In this way, the OSS can achieves more-efficient allocation of the CBRS spectrum and therefore more-desirable network communications without interfering with the incumbent's communications.

20 Claims, 3 Drawing Sheets

200

(56)                    References Cited

U.S. PATENT DOCUMENTS

| | | | |
|---|---|---|---|
| 2022/0386248 A1* | 12/2022 | Furuichi | H04W 16/08 |
| 2023/0262611 A1* | 8/2023 | Kuriki | H04W 52/30 |
| | | | 455/522 |
| 2024/0172142 A1* | 5/2024 | Kuriki | H04W 16/14 |

* cited by examiner

100

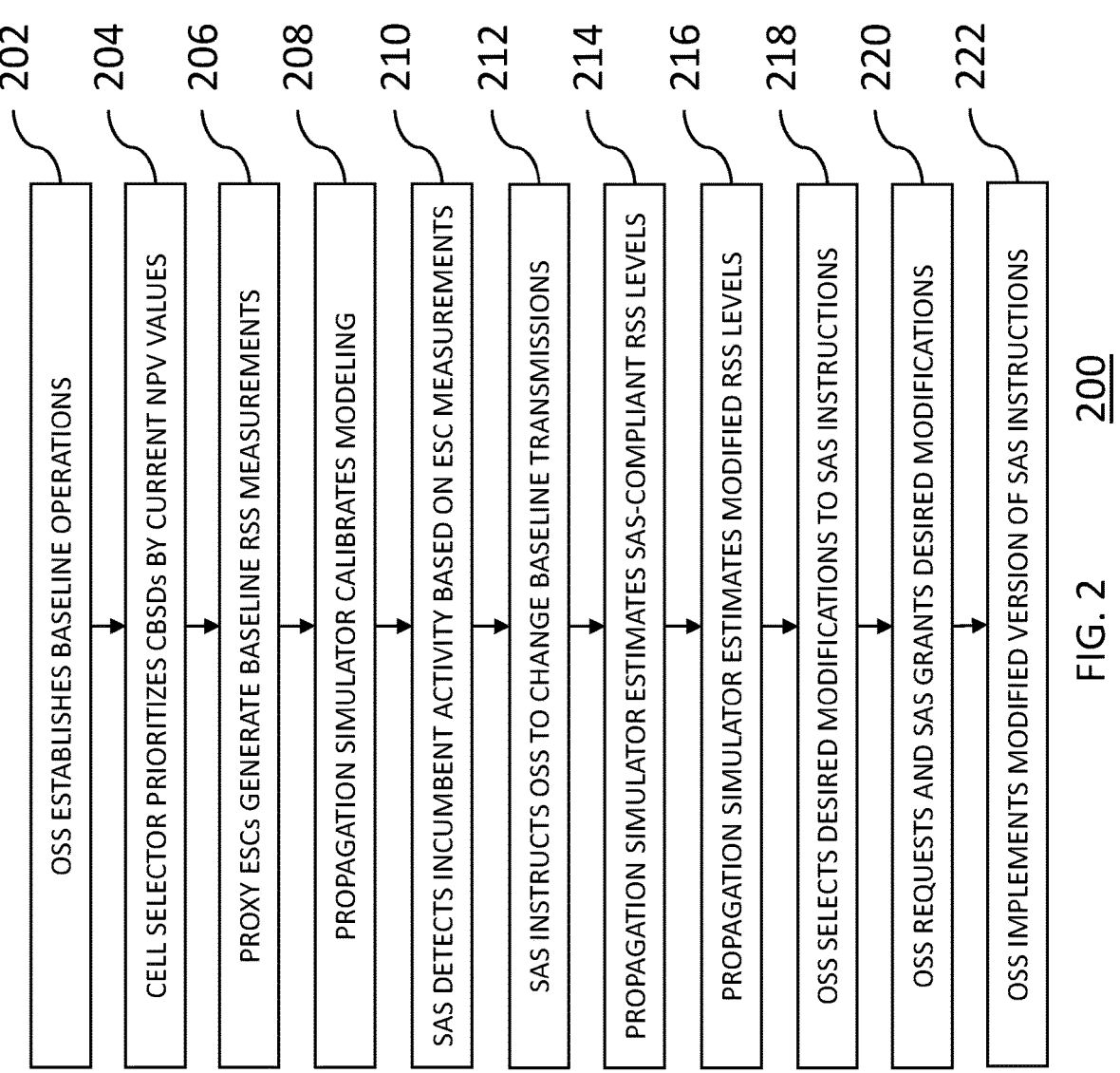

202 — OSS ESTABLISHES BASELINE OPERATIONS

204 — CELL SELECTOR PRIORITIZES CBSDs BY CURRENT NPV VALUES

206 — PROXY ESCs GENERATE BASELINE RSS MEASUREMENTS

208 — PROPAGATION SIMULATOR CALIBRATES MODELING

210 — SAS DETECTS INCUMBENT ACTIVITY BASED ON ESC MEASUREMENTS

212 — SAS INSTRUCTS OSS TO CHANGE BASELINE TRANSMISSIONS

214 — PROPAGATION SIMULATOR ESTIMATES SAS-COMPLIANT RSS LEVELS

216 — PROPAGATION SIMULATOR ESTIMATES MODIFIED RSS LEVELS

218 — OSS SELECTS DESIRED MODIFICATIONS TO SAS INSTRUCTIONS

220 — OSS REQUESTS AND SAS GRANTS DESIRED MODIFICATIONS

222 — OSS IMPLEMENTS MODIFIED VERSION OF SAS INSTRUCTIONS

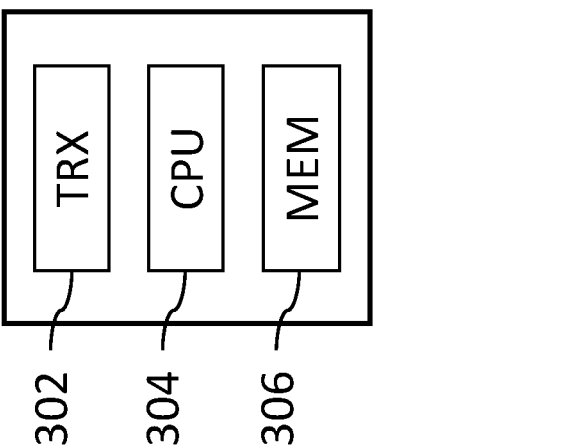
FIG. 3     300

RESTORED COVERAGE UNDER SAS SUSPENSION DUE TO INCUMBENT ACTIVITY IN A CBRS NETWORK

BACKGROUND

Field of the Disclosure

The present disclosure relates to wireless communication systems and, more specifically but not exclusively, to different wireless communication networks sharing the same spectrum controlled by SAS in CBRS domain.

Description of the Related Art

This section introduces aspects that may help facilitate a better understanding of the disclosure. Accordingly, the statements of this section are to be read in this light and are not to be understood as admissions about what is prior art or what is not prior art.

The Citizens Broadband Radio Service (CBRS) spectrum is shared among three different types of users: incumbents, priority access license (PAL) users, and general authorized access (GAA) users, where incumbents have priority over PAL users, and PAL users have priority of GAA users. Incumbents are U.S. government users, while PAL and GAA users are commercial wireless network providers. In a particular geographical area, a spectrum access system (SAS) is responsible for coordinating the allocation of sub-bands (i.e., channels, frequencies) within the CBRS spectrum to the various users.

In some geographical areas, incumbents are intermittent users of the CBRS spectrum. A SAS may deploy environmental sensing capability (ESC) sensors within its geographical area to detect CBRS transmissions from incumbents. For example, in coastal areas where incumbents are U.S. government ships, ESC sensors may be deployed along the coastline and oriented to detect CBRS transmissions from such ships traveling along the coast. In general, incumbents may also be land-based or air-based, such as U.S. government planes and satellites.

If and when the SAS determines, based on ESC sensor data, that an incumbent user of at least a portion of the CBRS spectrum is active in the SAS's geographical area, the SAS will instruct specific PAL and/or GAA users to (i) either cease operating or at least operate at lower power levels within the identical and/or nearby portions of the CBRS spectrum and (ii) possibly move their transmissions to other CBRS sub-bands to prevent or at least limit interference with the incumbent's communications. For example, when the incumbent is a U.S. government ship traveling along the coast, the SAS may instruct PAL/GAA network providers to cease or limit their transmissions in specific CBRS sub-bands from specific ones of their CBRS base stations (aka CBSDs) that are located most closely to the coastline until the incumbent has ceased its transmissions in the corresponding geographical area.

SUMMARY

One of the drawbacks of the above-described conventional SAS processing is that it does not take into account the relative importance of different CBSDs within the wireless network of a given wireless service provider. As a result, for a given wireless service provider, the instructions from the SAS to cease or limit transmissions from particular CBSDs upon the detection of incumbent activity (i.e., CBRS transmissions) may result in inefficient allocation of the CBRS spectrum to that service provider's CBSDs. The present disclosure is directed to techniques for improving the allocation of the CBRS spectrum to a service provider's CBSDs in response to a SAS suspension of normal transmissions due to incumbent activity.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 2 is a flow diagram for one possible algorithm implemented in the CBRS wireless communication system of FIG. 1; and FIG. 3 is a simplified hardware block diagram of an example node that can be used to implement the OSS of FIG. 1.

DETAILED DESCRIPTION

Figure 1:
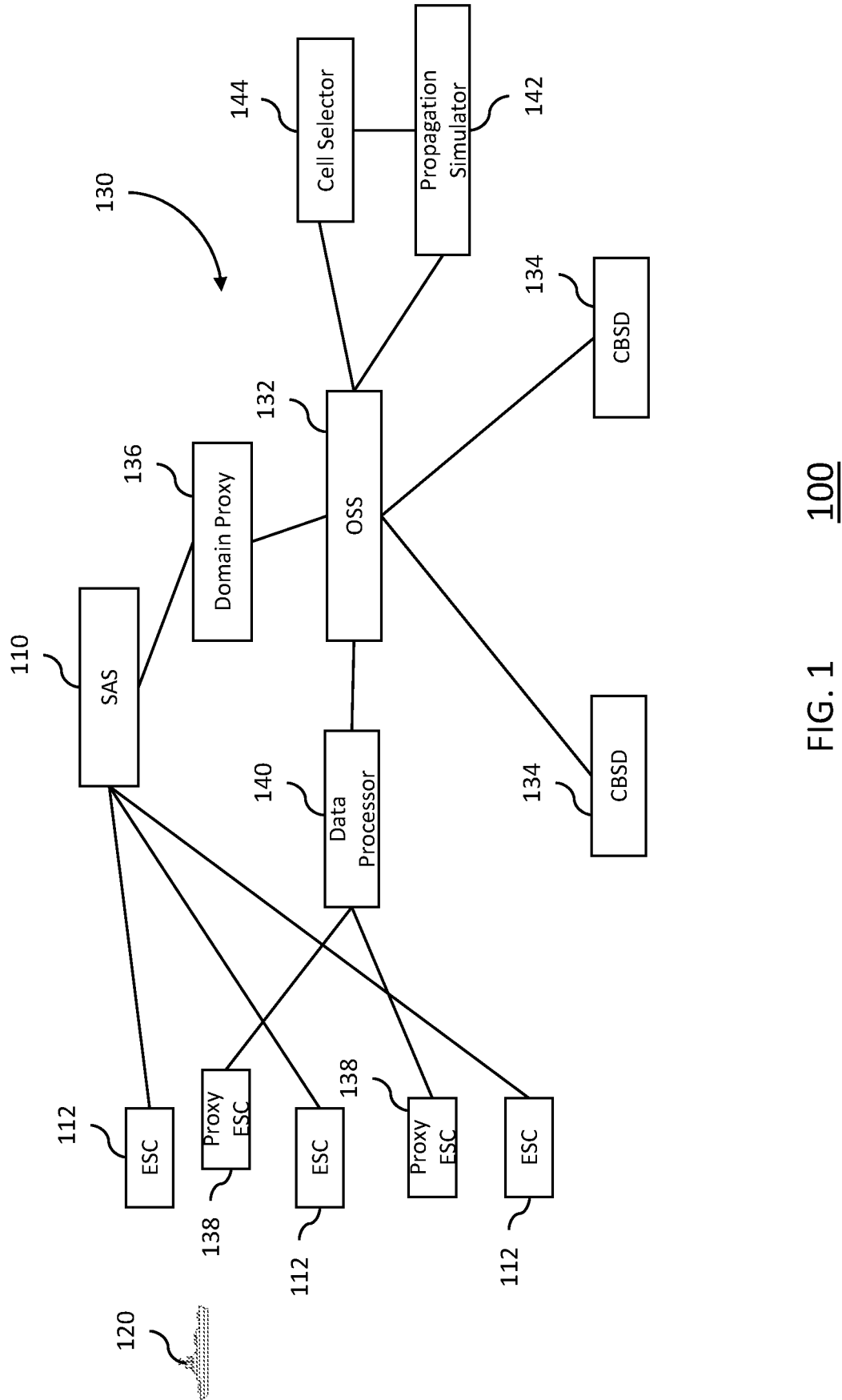
FIG. 1 is a simplified block diagram of a CBRS wireless communication system, according to one possible embodiment of the disclosure.

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

FIG. 1 is a simplified block diagram of a CBRS wireless communication system 100, according to one possible embodiment of the disclosure. FIG. 1 shows a SAS 110 connected to receive signals from a number of its ESC sensors 112 that are deployed to detect the activity of an incumbent, in this case, a U.S. government ship 120. The rest of the elements shown in FIG. 1 are part of the wireless communication network 130 of a particular service provider that shares the CBRS spectrum. Although not shown in FIG. 1, those skilled in the art will understand that the same geographical area may include elements of the wireless communication networks of one or more other service providers that also share the CBRS spectrum.

As shown in FIG. 1, the wireless communication network 130 includes:

Operation & Support System (OSS) 132, which represents the backbone of the network 130;

CBSDs 134 of the network 130;

Domain proxy 136 via which the SAS 110 communicates with the OSS 132;

Proxy ESC sensors 138, which measure received signal strength (RSS) levels in the CBRS spectrum at their respective locations within the network's geographical area;

Data processor 140, which receives and processes the RSS measurements from the proxy ESC sensors 138;

Propagation simulator 142, which estimates RSS levels at different locations within the geographical area of the network 130 by running calculations; and Cell selector 144, which determines current relative priorities among the network's CBSDs 134.

Note that, in general, FIG. 1 represents the architecture of the system 100, not its geographical arrangement.

Although FIG. 1 shows three ESC sensors 112, two proxy ESC sensors 138, and two CBSDs 134, those skilled in the art will understand that system 100 may have any suitable number of each type of sensor and any suitable number of CBSDs. In some implementations, at least some of the CBSDs 134 may function as proxy ESC sensors 138. Although FIG. 1 shows domain proxy 136, data processor 140, propagation simulator 142, and cell selector 144 as being network elements separate from the OSS 132, they may equivalently be characterized as different functions performed by the OSS 132.

In operation, if and when the SAS 110 determines, based on signals from its ESC sensors 112, that an incumbent, in this case, the U.S. government ship 120, is transmitting in at least some portion of the CBRS spectrum, the SAS 110 will instruct the OSS 132 to cease or limit transmissions in specifically identified CBRS sub-bands from specifically identified ones of the network's CBSDs 134. In response, as described in further detail below, the OSS 132 will initiate a procedure to determine if a more-efficient allocation of the CBRS spectrum to its CBSDs 134 is possible and, if so, communicate with the SAS 110 to achieve that more-efficient allocation.

As used herein, the term "impacted CBSD" refers to a CBSD whose transmissions are to be modified (e.g., typically reduced or ceased) according to SAS instructions following SAS detection of incumbent activity, while the term "non-impacted CBSD" refers to a CBSD whose transmissions do not have to be modified according to those same SAS instructions.

For example, upon detection of activity by the incumbent 120 at a particular location, the SAS 110 may determine that the CBSDs 134 of the network 130 that are physically closest to the incumbent's location should cease or limit operations in the same or nearby portions of the CBRS spectrum that are being used by the incumbent 120. It may be the case, however, that the net present value (NPV) of one of those impacted CBSDs 134 is significantly greater than the NPVs of one or more non-impacted CBSDs 134 of the network 130.

In some implementations, NPV values may be based, at least in part, on one or more of the following:

The number of instances of user equipment (UE) (not shown in FIG. 1) currently communicating with each different CBSD 134;

The distances of the UEs from their current CBSDs 134;

The volume of traffic currently being handled by each different CBSD 134;

Whether certain CBSDs are required to provide continuity of service;

Whether certain CBSDs provide network sliced services such as ultra-reliable, low-latency services;

Whether certain CBSDs support emergency services or have no alternative means of communication; and CBSDs and network customers having other high-priority needs as defined by the network operator.

In addition, maintaining transmissions from contiguous CBSDs 134 (i.e., CBSDs having overlapping coverage areas) may be valued to support mobile UEs.

In general, the propagation simulator 142 may employ a conventional technique to estimate values for the RSS levels at different locations within the network's geographical area based on digital data such as clutter, terrain, building heights, etc. Existing commercial products that can be used to implement the propagation simulator 142 include, without limitation, the Atoll platform by Forsk S.A.S. of Blagnac, France, and the Mentum Planet propagation model by Infovista Technologies, Inc., of Billerica, Massachusetts. In general, the propagation simulator 142 can be a program running algorithms on digital data, e.g., a program making calculations based on digital terrain, building heights, and morphologies data. The propagation simulator 142 will use empirical, deterministic, or hybrid formulas to determine the propagation losses and subsequently determine how far a signal will propagate. Big data tools could be leveraged to predict how far a cell will propagate with given power. The propagation simulator 142 may employ an empirical, deterministic, or hybrid model formula to calculate signals coming out of each CBSD 134 and estimate RSS levels at the different locations, such as the location of the incumbent 120. In some implementations, these techniques may be purely predictive based on specified transmission power levels from the CBSDs 134. In other implementations, these techniques may involve actual RSS measurements from the proxy ESC sensors 138.

In particular, the propagation simulator 142 can estimate values for the RSS levels based on the specific instructions received by the OSS 132 from the SAS 110. In some implementations, the OSS 132 actually implements those SAS instructions by ceasing and/or limiting the transmissions by the impacted CBSDs 134 in the specified CBRS sub-bands. In those implementations, the RSS measurements from the proxy ESC sensors 138 will provide real-world measurements of the RSS levels at the sensors' specific locations. The propagation simulator 142 may then use those actual RSS measurements to update its modeling and estimate RSS levels at other locations. In other implementations, the propagation simulator 142 generates estimated RSS levels using modeling without using any actual RSS measurements. For those implementations, the OSS 132 need not actually implement the SAS instructions.

In either case, in addition, the propagation simulator 142 is able to predict estimated RSS levels that would result from other combinations of transmissions from the network's CBSDs 134 that differ from the instructions received from the SAS 110. For example, if one or more of the impacted CBSDs 134 have greater NPV values than one or more of the non-impacted CBSDs 134, the propagation simulator 142 can predict the estimated RSS levels for a combination of transmissions that includes (i) greater transmissions from the one or more higher-NPV impacted CBSDs 134 and (ii) lesser or ceased transmissions from the one or more lower-NPV non-impacted CBSDs 134 compared to the transmission power levels according to the SAS instructions. The propagation simulator 142 can tweak the transmission power levels from different combinations of CBSDs 134 to predict estimated RSS levels that are the same as or lower than the RSS levels for the specific combination of transmissions instructed by the SAS 110.

If the propagation simulator 142 identifies a more-efficient combination of CBRS transmissions than the SAS's specific combination, then the OSS 132 can (i) reduce or terminate transmission power levels from one or more non-impacted CBSDs 134 and (ii) request, from the SAS 110, allocation of specific transmission power levels for specific CBRS sub-bands for specific ones of its impacted CBSDs 134 that the propagation simulator 142 has determined will not adversely affect the communications of the incumbent 120. In some implementations, the OSS 132 bundles multiple grant requests to the SAS 110 for multiple, impacted CBSD 134. In some implementations, the OSS 132 adjusts the transmission power levels for one or more non-impacted CBSDs 134 on its own without relinquishing the corresponding grants at the SAS 110. In other implementations, the OSS 132 notifies the SAS 110 of those adjustments and may relinquish the corresponding grants.

FIG. 2 is a flow diagram for one possible algorithm 200 implemented in the CBRS wireless communication system 100 of FIG. 1.

Prior to the detection of incumbent activity by the SAS 110, in step 202, the OSS 132 establishes baseline operations for its CBSDs 134. This step involves (i) the OSS 132 transmitting, to the SAS 110, requests for grants of specific CBRS sub-bands for specific CBSDs 134, (ii) the SAS 110 determining which grants to approve and at what transmission power levels and transmitting corresponding responses back to the OSS 132, and (iii) the OSS 132 enabling those CBSDs 134 to transmit based on the approved grants.

In step 204, the cell selector 144 prioritizes the CBSDs based on the current NPV values for their baseline operations of step 202 and generates an NPV-prioritized list of the CBSDs for the OSS 132.

In step 206, the proxy ESC sensors 138 generate baseline RSS measurements of the RSS levels for the CBSDs baseline operations of step 202 and provides those baseline RSS measurements to the data processor 140, which processes those RSS measurements for the OSS 132. The data processor 140 can either be integrated with the OSS 132 or work separately as a function. This function is responsible for the collection of data from the proxy ESC sensors 138. Since the data can come from 10s or even 100s of proxy ESC sensors 138, this function will process (e.g., mainly data consolidation) and feed the data in a form that is acceptable for the OSS 132. The data processing may include data averaging and/or finding the median values over time.

In step 208, the propagation simulator 142 uses the baseline RSS measurements to calibrate the modeling that it uses to generate estimated RSS levels at different locations within the network's geographical area. In particular, the propagation simulator 142 (i) applies the approved baseline grants from the SAS to its current modeling to estimate RSS levels at the locations of the proxy ESC sensors 138 and (ii) compares those estimated RSS levels to the actual baseline RSS measurements from the proxy ESC sensors 138 to calibrate its modeling using standard calibration techniques, such as model tuning which uses actual measurements to enhance propagation models. Note that this calibration can be repeated as the baseline operations of the CBSDs are modified over time as part of normal network operations to fine-tune the propagation simulator's modeling.

In step 210, the SAS 110 detects activity by an incumbent, e.g., the incumbent 120 of FIG. 1, based on measurements from the SAS's ESC sensors AC.

In step 212, the SAS 110 instructs the OSS 132 to change the baseline operations of at least some of its CBSDs 134, where each change is either a cessation of transmissions from a specified impacted CBSD 134 in one or more specified CBRS sub-bands or a specified reduction in the transmitted power level from a specified impacted CBSD 134 in one or more specified CBRS sub-bands, in order to avoid interfering with the communications of the detected incumbent.

In step 214, the OSS 132 instructs the propagation simulator 142 to apply the changes specified in the instructions from the SAS 110 to its currently calibrated modeling to generate SAS-compliant, estimated RSS levels that would exist if the OSS 132 were to implement the SAS instructions. As described next, the OSS 132 uses these estimated, SAS-compliant RSS levels as target values for its subsequent processing.

In step 216, based on the NPV-prioritized list of CBSDs from the cell selector 144, the OSS 132 instructs the propagation simulator 142 to generate modified, estimated RSS levels based on possible modifications to the SAS instructions. For example, if an impacted CBSD 134 according to the SAS instructions has a significantly higher NPV value than a non-impacted CBSD 134, then the OSS 132 may instruct the propagation simulator 142 to generate modified, estimated RSS levels for a possible, modified version of the SAS instructions that (i) includes baseline transmissions from the impacted, higher-NPV CBSD 134 and (ii) reduced or ceased transmissions from the non-impacted, lower-NPV CBSD 134.

In step 218, the OSS 132 compares the modified, estimated RSS levels from step 216 with the SAS-compliant, estimated RSS levels from step 214 to determine whether the possible, modified version of the SAS instructions would be acceptable to the SAS 110. In general, a modified version of the SAS instructions would be acceptable to the SAS 110 if the RSS levels for the modified version would not be more than (or at least not much more than) the RSS levels for the unmodified version of the SAS instructions.

Note that the processing of steps 216 and 218 may be iterative as the OSS 132 tries different combinations of modifications to the SAS instructions that prioritize higher-NPV CBSDs 134 without significantly risking interference with the incumbent's communications. At some point in this iterative processing of steps 216 and 218, the OSS 132 selects a desired, optimal set of modifications to the SAS instructions.

In step 220, the OSS 132 transmits, to the SAS 110, requests for grants corresponding to the desired modifications to the SAS instructions and, if accepted, the SAS 110 transmits its approvals of those grants to the OSS 132. Depending on the particular implementation, step 220 may be viewed as the OSS 132 negotiating with the SAS 110 for modifications to the SAS instructions. In some implementations, the OSS 132 submits requests to the SAS 110 one by one starting with the highest-NPV CBSD 134 and continuing with progressively lower-NPC CBSDs 134 with the SAS 110 accepting or rejecting each successive request. In other implementations, the OSS 132 submits a set of requests to the SAS 110, where the SAS 110 might accept all of those requests or only a subset of those requests.

In step 222, the OSS 132 enables its CBSDs 134 to transmit based on the modified version of the SAS instructions, i.e., the SAS instructions of step 212 as modified based on the grants of step 220. In this way, the OSS 132 can achieve more-efficient network operations than would result from the SAS instructions of step 212 without significantly impacting the communications of the incumbent 120.

Although not reflected in FIG. 2, if and when the SAS 110 determines that the incumbent activity has terminated, e.g., again based on RSS measurements from its ESC sensors AC, (i) the SAS 110 may inform the OSS 132 that normal operations may be resumed so that the OSS 132 can then decide whether and how to proceed with requesting grants from the SAS 110 and/or (ii) the SAS 110 may issue grants to the OSS 132 on the SAS's own initiative, for example, based on the baseline operations of step 202 that were in existence prior to the detection of incumbent activity of step 210.

In some implementations of the algorithm 200 of FIG. 2, the OSS 132 estimates the approximate current location of the incumbent 120 to determine which direction the incumbent is operating in relative to a CBSD. This optional feature is based on the proxy ESC sensors 138 having the capability to distinguish incumbent signals from network signals. For example, such proxy ESC sensors 138 may be able to detect incumbent activity as a sudden increase in CBRS energy. Since the proxy ESC sensors 138 are geographically separated from each other, the approximate location of an incumbent or at least the general direction of the incumbent signals may be determined using, for example, conventional network triangulation and estimation techniques. In those implementations, the estimated RSS levels at the location of the incumbent 120 would be highly relevant to the OSS's assessment of the acceptability of different possible modifications to the SAS instructions.

In the algorithm 200 of FIG. 2, the OSS 132 does not implement the SAS instructions of step 212 until after the OSS 132 determines whether any modifications to those SAS instructions would be acceptable to the SAS 110 and preferable for the OSS's own network operations. In other possible embodiments, the OSS 132 implements some or even all of the SAS instructions of step 212 before attempting to modify those instructions. In those embodiments, the OSS 132 could use the actual RSS measurements from the proxy ESC sensors 138 as SAS-compliant RSS values in assessing the acceptability of modifications to the SAS instructions.

In the algorithm 200 of FIG. 2, in step 204, the cell selector 144 determines NPV values and prioritizes the CBSDs 134 based on the baseline operations of step 202 before incumbent activity is detected in step 210. In some alternative algorithms, the NPV values of step 204 are not readily available. Instead, the cell selector 144 determines NPV values and prioritizes the CBSDs 134 dynamically based on the RSS levels generated by the propagation simulator 142 in steps 214 and/or 216.

FIG. 3 is a simplified hardware block diagram of an example node 300 that can be used to implement the OSS 132 of FIG. 1 along with some or all of the functions of the elements 136, 140, 142, and 144 of FIG. 1. As shown in FIG. 3, the node 300 includes (i) communication hardware (e.g., wireless, wireline, and/or optical transceivers (TRX)) 302 that supports communications with other nodes, (ii) at least one processor (e.g., CPU microprocessor) 304 that controls the operations of the node 300, and (iii) a memory (e.g., RAM, ROM) 306 that stores code executed by the processor 304 and/or data generated and/or received by the node 300.

In certain embodiments, the present disclosure is an OSS of a CBRS network provider having a set of CBSDs, the OSS comprises a memory and at least one processor, coupled to the memory and operative to (i) establish first transmissions by the set of CBSDs; (ii) receive instructions from a SAS to establish second transmissions by the set of CBSDs including modified transmission power levels from one or more impacted CBSDs of the set to avoid interfering with communications of a CBRS incumbent; (iii) determine, based on the second transmissions, first RSS levels at one or more locations; (iv) identify at least one of the one or more impacted CBSDs having an NPV value greater than at least one non-impacted CBSD of the set; (v) determine second RSS levels at the one or more locations based on third transmissions by the set of CBSDs corresponding to (i) a decreased transmission power level from the at least one non-impacted CBSD and (ii) an increased transmission power level from the at least one impacted CBSD relative to the second transmissions; (vi) compare the second RSS levels to the first RSS levels; and (vii) based on the comparison, transmit a request to the SAS to transmit at the increased transmission power level from the at least one impacted CBSD.

In at least some of the above embodiments, the OSS is configured to determine an incumbent location of the CBRS incumbent and generate first and second RSS levels for the incumbent location.

In at least some of the above embodiments, the OSS is configured to generate the second RSS levels using RSS measurements from one or more proxy ESC sensors.

In at least some of the above embodiments, the OSS is configured to implement a propagation simulator to determine the second RSS levels.

In at least some of the above embodiments, the OSS is configured to implement the propagation simulator to determine the first RSS levels.

In at least some of the above embodiments, the OSS is configured to calibrate the propagation simulator based on RSS measurements from one or more proxy ESC sensors.

In at least some of the above embodiments, the OSS is configured to implement the instructions from the SAS and determine the first RSS levels based on RSS measurements from one or more proxy ESC sensors.

In at least some of the above embodiments, the OSS is configured to identify the at least one impacted CBSD having an NPV value greater than the at least one non-impacted CBSD.

In at least some of the above embodiments, the OSS is further configured to (a) receive a grant from the SAS to transmit at the increased transmission power level from the at least one impacted CBSD and (b) establish transmissions (1) from the at least one impacted CBSD at the increased transmission power level and (2) from the at least one non-impacted CBSD at the decreased transmission power level.

In at least some of the above embodiments, the OSS is configured to establish the transmissions from the at least one non-impacted CBSD at the decreased transmission power level without modifying a corresponding, previously received grant from the SAS.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits. The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A method for an Operation & Support System (OSS) of a Citizens Broadband Radio Service (CBRS) network having a set of CBRS base stations (CBSDs) controlled by the OSS, the method comprising the OSS:

establishing first transmissions by the set of CBSDs;
receiving instructions from a Spectrum Access System (SAS) to establish second transmissions by the set of CBSDs including modified transmission power levels from one or more impacted CBSDs of the set to avoid interfering with communications of a CBRS incumbent;
determining, based on the second transmissions, first received signal strength (RSS) levels at one or more locations;
identifying at least one of the one or more impacted CBSDs having a net present value (NPV) greater than at least one non-impacted CBSD of the set;
determining second RSS levels at the one or more locations based on third transmissions by the set of CBSDs corresponding to (i) a decreased transmission power level from the at least one non-impacted CBSD and (ii) an increased transmission power level from the at least one impacted CBSD relative to the second transmissions;
comparing the second RSS levels to the first RSS levels; and
based on the comparing, transmitting a request to the SAS to transmit at the increased transmission power level from the at least one impacted CBSD.

2. The method of claim 1, wherein the OSS determines an incumbent location of the CBRS incumbent and generates first and second RSS levels for the incumbent location.

3. The method of claim 1, wherein the OSS generates the second RSS levels using RSS measurements from one or more proxy environmental sensing capability (ESC) sensors.

4. The method of claim 1, wherein the OSS implements a propagation simulator to determine the second RSS levels.

5. The method of claim 4, wherein the OSS implements the propagation simulator to determine the first RSS levels.

6. The method of claim 4, wherein the OSS calibrates the propagation simulator based on RSS measurements from one or more proxy ESC sensors.

7. The method of claim 4, wherein the OSS implements the instructions from the SAS and determines the first RSS levels based on RSS measurements from one or more proxy ESC sensors.

8. The method of claim 1, wherein the OSS identifies the at least one impacted CBSD having an NPV value greater than the at least one non-impacted CBSD.

9. The method of claim 1, further comprising the OSS:
receiving a grant from the SAS to transmit at the increased transmission power level from the at least one impacted CBSD; and
establishing transmissions (i) from the at least one impacted CBSD at the increased transmission power level and (ii) from the at least one non-impacted CBSD at the decreased transmission power level.

10. The method of claim 9, wherein the OSS establishes the transmissions from the at least one non-impacted CBSD at the decreased transmission power level without modifying a corresponding, previously received grant from the SAS.

11. An OSS of a CBRS network provider having a set of CBSDs, the OSS comprising:
a memory; and
at least one processor, coupled to the memory and operative to:
establish first transmissions by the set of CBSDs;
receive instructions from a SAS to establish second transmissions by the set of CBSDs including modified transmission power levels from one or more impacted CBSDs of the set to avoid interfering with communications of a CBRS incumbent;
determine, based on the second transmissions, first RSS levels at one or more locations;
identify at least one of the one or more impacted CBSDs having an NPV value greater than at least one non-impacted CBSD of the set;
determine second RSS levels at the one or more locations based on third transmissions by the set of CBSDs corresponding to (i) a decreased transmission power level from the at least one non-impacted CBSD and (ii) an increased transmission power level from the at least one impacted CBSD relative to the second transmissions;
compare the second RSS levels to the first RSS levels; and
based on the comparison, transmit a request to the SAS to transmit at the increased transmission power level from the at least one impacted CBSD.

12. The OSS of claim 11, wherein the OSS is configured to determine an incumbent location of the CBRS incumbent and generate first and second RSS levels for the incumbent location.

13. The OSS of claim 11, wherein the OSS is configured to generate the second RSS levels using RSS measurements from one or more proxy ESC sensors.

14. The OSS of claim 11, wherein the OSS is configured to implement a propagation simulator to determine the second RSS levels.

15. The OSS of claim 14, wherein the OSS is configured to implement the propagation simulator to determine the first RSS levels.

16. The OSS of claim 14, wherein the OSS is configured to calibrate the propagation simulator based on RSS measurements from one or more proxy ESC sensors.

17. The OSS of claim 14, wherein the OSS is configured to implement the instructions from the SAS and determine the first RSS levels based on RSS measurements from one or more proxy ESC sensors.

18. The OSS of claim 11, wherein the OSS is configured to identify the at least one impacted CBSD having an NPV value greater than the at least one non-impacted CBSD.

19. The OSS of claim 11, wherein the OSS is further configured to:

receive a grant from the SAS to transmit at the increased transmission power level from the at least one impacted CBSD; and establish transmissions (i) from the at least one impacted CBSD at the increased transmission power level and (ii) from the at least one non-impacted CBSD at the decreased transmission power level.

20. The OSS of claim 19, wherein the OSS is configured to establish the transmissions from the at least one non-impacted CBSD at the decreased transmission power level without modifying a corresponding, previously received grant from the SAS.

\* \* \* \* \*